(12) United States Patent
Gill

(10) Patent No.: US 11,441,429 B2
(45) Date of Patent: Sep. 13, 2022

(54) COMPOSITE FAN BLADE AND MANUFACTURING METHOD THEREOF

(71) Applicant: ROLLS-ROYCE plc, London (GB)

(72) Inventor: Vincent Gill, Bristol (GB)

(73) Assignee: ROLLS-ROYCE PLC, London (GB)

( * ) Notice: Subject to any disclaimer, the term of this patent is extended or adjusted under 35 U.S.C. 154(b) by 791 days.

(21) Appl. No.: 16/277,420

(22) Filed: Feb. 15, 2019

(65) Prior Publication Data
US 2019/0277141 A1 Sep. 12, 2019

(30) Foreign Application Priority Data
Mar. 9, 2018 (GB) ...................... 1803802

(51) Int. Cl.
*F01D 5/14* (2006.01)
*F01D 5/28* (2006.01)
(Continued)

(52) U.S. Cl.
CPC ............. *F01D 5/147* (2013.01); *F01D 5/282* (2013.01); *B29C 70/081* (2013.01); *B29C 70/12* (2013.01); *B29C 70/30* (2013.01); *B29C 70/345* (2013.01); *B29C 70/36* (2013.01); *B29C 70/54* (2013.01); *B29C 70/682* (2013.01); *B29C 70/70* (2013.01); *B29D 99/0025* (2013.01); *B29L 2031/08* (2013.01); *B29L 2031/082* (2013.01); *B32B 1/00* (2013.01); *B32B 5/06* (2013.01); *B32B 5/26* (2013.01); *B32B 38/0012* (2013.01); *B32B 38/1808* (2013.01); *B32B 2250/20* (2013.01);
(Continued)

(58) Field of Classification Search
None
See application file for complete search history.

(56) References Cited

U.S. PATENT DOCUMENTS 2,859,936 A   11/1958 Warnken
3,132,841 A    5/1964 Wilder
(Continued)

FOREIGN PATENT DOCUMENTS

CN     106863848 A  *  6/2017
EP     0 465 169 A1     1/1992
(Continued)

OTHER PUBLICATIONS

Machine English translation of CN106863848A, Accessed Jan. 24, 2022 (Year: 2017).*

(Continued)

*Primary Examiner* — Francisco W Tschen
*Assistant Examiner* — Adrianna N Konves
(74) *Attorney, Agent, or Firm* — Oliff PLC

(57) ABSTRACT

A method of manufacturing a composite fan blade with an outer part and a core includes laying up a plurality of continuous plies to achieve a stack, placing the core on a central portion of the stack of continuous plies to achieve an unfolded preform; folding the contin-uous plies about the core, such that the central portion of the stack folds about the core and the first portion is superimposed to the second portion, to achieve a folded preform; apply-ing pressure to the folded preform to achieve a consolidated curved folded preform; curing the consolidated curved folded preform to achieve the composite fan blade.

16 Claims, 3 Drawing Sheets

(51) Int. Cl.

| | | |
|---|---|---|
| B29C 70/36 | (2006.01) | |
| B29C 70/54 | (2006.01) | |
| B29C 70/70 | (2006.01) | |
| B29L 31/08 | (2006.01) | |
| B32B 1/00 | (2006.01) | |
| B32B 5/06 | (2006.01) | |
| B32B 5/26 | (2006.01) | |
| B32B 38/00 | (2006.01) | |
| B32B 38/18 | (2006.01) | |
| B29C 70/08 | (2006.01) | |
| B29C 70/12 | (2006.01) | |
| B29C 70/34 | (2006.01) | |
| B29C 70/68 | (2006.01) | |
| B29D 99/00 | (2010.01) | |
| B29C 70/30 | (2006.01) | |

(52) U.S. Cl.
CPC ....... *B32B 2255/02* (2013.01); *B32B 2255/26* (2013.01); *B32B 2305/076* (2013.01); *B32B 2603/00* (2013.01); *F05D 2220/32* (2013.01); *F05D 2230/40* (2013.01); *F05D 2300/44* (2013.01); *F05D 2300/603* (2013.01); *F05D 2300/6034* (2013.01); *F05D 2300/611* (2013.01)

(56) References Cited

U.S. PATENT DOCUMENTS

| | | | |
|---|---|---|---|
| 3,487,879 | A | 1/1970 | McCarthy et al. |
| 3,873,654 | A | 3/1975 | Smith |
| 4,031,601 | A | 6/1977 | Staub et al. |
| 4,949,921 | A | 8/1990 | Jarmon et al. |
| 5,240,377 | A | 8/1993 | Farr |
| 5,279,892 | A | 1/1994 | Baldwin et al. |
| 5,403,153 | A | 4/1995 | Goetze |
| 5,518,385 | A | 5/1996 | Graff |
| 8,109,734 | B2 | 2/2012 | Backhouse |
| 9,669,570 | B2 | 6/2017 | Godon et al. |
| 2008/0260536 | A1 | 10/2008 | Beckford et al. |
| 2009/0232647 | A1 | 9/2009 | Henkle et al. |
| 2009/0246446 | A1 | 10/2009 | Backhouse |
| 2011/0038732 | A1 | 2/2011 | Huth et al. |
| 2012/0171044 | A1 | 7/2012 | Berard et al. |
| 2012/0230829 | A1 | 9/2012 | Benkler et al. |
| 2013/0052897 | A1* | 2/2013 | Rogers ............ B32B 5/12 442/58 |
| 2013/0251939 | A1* | 9/2013 | Kleinow ............ F01D 5/284 428/121 |
| 2015/0360440 | A1* | 12/2015 | Kisch ............... B32B 5/02 428/189 |
| 2016/0032939 | A1 | 2/2016 | Anderson et al. |
| 2018/0036914 | A1 | 2/2018 | Marsal et al. |
| 2018/0304562 | A1 | 10/2018 | Murakami et al. |

FOREIGN PATENT DOCUMENTS

| | | |
|---|---|---|
| EP | 1 930 548 A2 | 6/2008 |
| EP | 2 105 579 A2 | 9/2009 |
| EP | 2 159 374 A2 | 3/2010 |
| EP | 2 327 538 A2 | 6/2011 |
| EP | 3 332 948 A1 | 6/2018 |
| GB | 775816 A | 5/1957 |
| GB | 871 066 A | 6/1961 |
| GB | 1 302 857 A | 1/1973 |
| GB | 2119303 A | 11/1983 |
| GB | 2 244 453 A | 12/1991 |
| GB | 2 262 315 A | 6/1993 |
| GB | 2 410 458 A | 8/2005 |
| WO | 2015/047511 A2 | 4/2015 |
| WO | 2017/126159 A1 | 7/2017 |

OTHER PUBLICATIONS

Aug. 14, 2019 Search Report issued in European Patent Application No. 19157125.
Aug. 23, 2019 extended Search Report issued in European Patent Application No. 19157127.2.
Aug. 23, 2019 extended Search Report issued in European Patent Application No. 19157128.0.
May 15, 2020 Office Action Issued in U.S. Appl. No. 16/277,494.
Oct. 7, 2020 U.S. Notice of Allowance issued U.S. Appl. No. 16/277,494.
Aug. 27, 2021 Notice of Allowance issued in U.S. Appl. No. 16/277,402.
U.S. Appl. No. 16/277,494, filed Feb. 15, 2019 in the name of Gill.
U.S. Appl. No. 16/277,402, filed Feb. 15, 2019 in the name of Backhouse et al.
Sep. 27, 2018 Search Report issued in British Patent Application No. 1805546.7.
Oct. 4, 2018 Search Report issued in British Patent Application No. 1805547.5.
Sep. 10, 2018 Search Report issued in British Patent Application No. 1803802.6.
Mar. 18, 2021 Office Action issued in U.S. Appl. No. 16/277,402.

* cited by examiner

COMPOSITE FAN BLADE AND MANUFACTURING METHOD THEREOF

CROSS-REFERENCE TO RELATED APPLICATIONS

This specification is based upon and claims the benefit of priority from UK Patent Application Number 1803802.6 filed on 9 Mar. 2018, the entire contents of which are incorporated herein by reference.

BACKGROUND

Field of the Disclosure

The present disclosure relates to a method of manufacturing a composite fan blade and a composite fan blade manufactured by the method.

Description of the Related Art

A fan blade may be manufactured for gas turbine engines. A gas turbine engine generally comprises, in axial flow series, an air intake, a fan, one or more compressors, a combustor, one or more turbines, and an exhaust nozzle. Air entering the air intake is accelerated by the fan to produce two air flows: a first air flow (core engine flow) into compressor and a second air flow (bypass flow) which passes through a bypass duct to provide propulsive thrust. Air entering the compressor is compressed, mixed with fuel and then fed into the combustor, where combustion of the air/fuel mixture occurs. The high temperature and high energy exhaust fluids are then fed to the turbine, where the energy of the fluids is converted to mechanical energy to drive the compressor in rotation by suitable interconnecting shaft. Downstream of the turbine, the core engine flow passes through a tail bearing housing provided with vanes.

The fan comprises a rotor hub and an array of fan blades radially extending therefrom. The fan blades generally comprises an aerofoil portion having a leading edge, a trailing edge, a pressure surface wall extending from the leading edge to the trailing edge and a suction surface wall extending from the leading edge to the trailing edge. The fan blades have a root via which the blade can be connected to the rotor hub and, at an opposing end to the root, a tip. The fan blades may be metallic fan blades or composite fan blades. Composite fan blades generally include a composite body made from a fibre reinforced resin matrix, e.g. carbon fibres in a resin matrix. The leading edge and the trailing edge of the fan blade may be shielded and/or reinforced, for example a metallic member may be provided on the trailing and/or leading edge of the composite body.

Composite fan blades are generally lighter than metallic fan blades with comparable mechanical properties, so, although more expensive to manufacture, composite fan blades are increasingly used in the aerospace industry and for gas turbine engines in particular.

The composite body of the fan blade is generally a laminate having a plurality of plies laid up into a stack. The laminate can be formed using a number of different methods, for example lay-up by hand or automated fibre placement (AFP). In known methods, the plies are laid-up manually or automatically on a preform tool shaped to the finished blade suction surface to produce a fan blade preform. Once all of the plies have been laid up, the preform is transferred into a tool and cured in an autoclave to the final shape. Briefly, in AFP, the fibre reinforcement material is applied in form of a single "tow", or multiple "tows". A "tow" may be a narrow width of tape slit from a wider tape. A lay-up head is typically used to dispense, apply and cut tows of fibre reinforcement material on the preform tool. Generally, as the lay-up head stops each time a tow (or tape) is cut, the more plies are cut, or, in other words, the shorter the applied tows, the more time is required to complete the lay-up process. Short plies are particularly ineffective at being deposited using AFP since there is less time spent placing material and more time spent in secondary operations such as cutting, positioning, accelerating and decelerating. As the lay-up head may be required to supply tows (or tapes) with different mutual orientation and therefore different length, the lay-up process may be quite time consuming.

Reducing the number of plies may speed up the process, but, as the lay-up head cannot apply tows (or tapes) longer than a longitudinal dimension of the preform tool, which substantially corresponds to the length of the fan blade along a spanwise direction, there is a minimum number of cuts required to build up the preform and therefore a minimum lay-up time. The same considerations apply to a manual lay-up process, namely the higher the number of plies, the slower the process.

Accordingly, it is desirable to overcome the above mentioned problems and reduce the lay-up time of a composite fan blade manufacturing method.

SUMMARY

According to a first aspect, there is provided a method of manufacturing a composite fan blade extending spanwise from a root to a tip, chordwise from a leading edge to a trailing edge, the composite fan blade comprising an outer part and a core, the outer part defining a pressure surface wall extending from the leading edge to the trailing edge and a suction surface wall extending from the leading edge to the trailing edge, the method comprising:

laying up a plurality of continuous plies extending along a longitudinal direction from a first end to a second end to achieve a stack of continuous plies, the stack comprising a first portion corresponding to the pressure surface wall, a second portion corresponding to the suction surface wall, and a central portion corresponding to the root, wherein the first end corresponds to a pressure surface tip region of the composite fan blade and the second end corresponds to a suction surface tip region of the composite fan blade;

placing the core on the central portion of the stack of continuous plies to achieve an unfolded preform;

folding the continuous plies about the core, such that the central portion of the stack folds about the core and the first portion is superimposed to the second portion, to achieve a folded preform;

applying pressure to the folded preform to achieve a consolidated curved folded preform;

curing the consolidated curved folded preform to achieve the composite fan blade.

The laying-up of the plurality of continuous plies may be carried out manually or automatically using automatic fibre placement. The continuous plies may be unidirectional (UD) plies. All of the continuous plies in the stack may have a same orientation. Alternatively, the continuous plies in the stack may have different mutual orientations.

The continuous plies may be made of dry fibres. Alternatively, the continuous fibres may be made of pre-impregnated fibres. Where the continuous plies are made of dry fibres, the method may further comprise, after the laying up of each continuous ply, depositing on an internal surface of said continuous ply a layer of thermoplastic or epoxy resin.

The composite fan blade may further comprise filler plies and the method may further comprise laying up the filler plies on the continuous plies both on the first portion and on the second portion. Alternatively, the method may comprise laying up the filler plies either on the first portion or on the second portion. The filler plies may not extend from the first portion to the second portion through the central portion. In other words, the filler ply may be interrupted at the central portion. The laying up of the filler plies on the continuous plies may be carried out before the placing of the core on the central portion. Alternatively, the laying up of the filler plies on the continuous plies may be carried out after the placing of the core on the central portion. Further alternatively, the method may comprise, in sequence, laying up filler plies on either the first or the second portion of the stack, placing the core on the central portion of the stack, and then laying up filler plies on either the second or the first portion of the stack, respectively.

Folding of the continuous plies may comprise folding all of the continuous plies at one time. Alternatively, folding of the continuous plies may comprise folding each continuous ply individually. Moreover, folding of the continuous plies may comprise folding the continuous plies in groups of two of more continuous plies.

Folding of the continuous plies may comprise rotating either the first portion or the second portion towards the second portion or the first portion, respectively, or both the first and the second portion towards each other.

The folding of the continuous plies may comprise rotating either the first or the second end by substantially 180° about the core towards the second or the first end, respectively, or both the first and the second end towards each other. In other words, the folding of the continuous plies may comprise rotating at least one of the first and the second portion about a chordwise direction, i.e. a direction perpendicular to a spanwise direction.

During the folding of the continuous plies, the method may further comprise keeping the core in position by means of a frame. Alternatively, during the folding of the continuous plies, the method may further comprise keeping the core in position manually or by means of an automated robotic arm.

During the folding of the continuous plies, the method may comprise applying pressure either manually or by means of a roller to the continuous ply being folded from the root to the tip. In addition, during the folding of the continuous plies, the method may comprise applying tension to the continuous ply being folded. For example, applying tension to the continuous ply being folded may comprise clamping opposite ends of the ply being folded to suppress the formation of wrinkles in the central portion.

The method may further comprise, after the folding of the continuous plies, transferring the folded preform to a resin transfer moulding operation in which a resin is injected and cured.

The method may further comprise, after the folding of the continuous plies, applying heat and/or pressure to the folded preform to promote adhesion of the core to the outer part. The method may further comprise, after the folding of the continuous plies, applying vacuum to the folded preform to promote debulk. For example, heat and/or pressure and/or vacuum may be applied concurrently to achieve the consolidated curved folded preform and promote debulk.

The method may further comprise applying through thickness reinforcement to reinforce the core to the outer part.

The method may further comprise mutually reinforcing the continuous plies. For example, the method may comprise applying through thickness reinforcement to the first portion and the second portion of the stack to enhance their mutual adhesion.

Through thickness reinforcement may comprise any one of tufting, stitching, felting, z-pinning, or intra-layer toughening using veils and nanoforests or thermoplastic toughening particles.

The placing of the core in the central portion may comprise depositing a plurality of chopped fibres on the central portion of the continuous plies. Alternatively, the placing of the core in the central portion may comprise depositing a pre-moulded core on the central portion of the continuous plies.

In a further alternative solution, the placing of the core in the central portion may comprise depositing a preformed core made of a metallic insert that allows for the blade to be mounted in a holding fixture. For example, the holding fixture may be a pin hinged root and the metallic insert may be a hollow metallic tube.

Where the continuous plies are made of dry fibres, after a consolidated curved folded preform is achieved and before curing, the method may comprise incorporating a matrix resin to the consolidated curved folded preform in an infiltration step.

According to a second aspect, there is provided an unfolded preform for manufacturing a composite fan blade comprising a plurality of continuous plies extending along a longitudinal direction from a first end to a second end to achieve a stack of continuous plies. The stack comprises a first portion corresponding to a pressure surface wall of the composite fan blade, a second portion corresponding to a suction surface wall of the composite fan blade, and a central portion corresponding to a root of the composite fan blade, wherein the first end corresponds to a pressure surface tip region of the composite fan blade and the second end corresponds to a suction surface tip region of the composite fan blade. The unfolded preform further comprises a core arranged at the central portion of the stack.

The first portion, the central portion, and the second portion may be arranged along the longitudinal direction. In other words, the central portion may be arranged midway between the first and the second portion along the longitudinal direction.

The unfolded preform may extend longitudinally at least twice a spanwise length of the fan blade.

The unfolded preform may further comprise filler plies arranged on the first portion and/or the second portion of the stack, the filler plies not extending from the first portion to the second portion through the central portion.

According to a third aspect, there is provided a composite fan blade extending spanwise from a root to a tip, chordwise from a leading edge to a trailing edge, the composite fan blade comprising an outer part and a core, the outer part defining a pressure surface wall extending from the leading edge to the trailing edge and a suction surface wall extending from the leading edge to the trailing edge, the composite fan blade being obtained by a method comprising:

laying up a plurality of continuous plies extending along a longitudinal direction from a first end to a second end to achieve a stack of continuous plies, the stack comprising a first portion corresponding to the pressure surface wall, a second portion corresponding to the suction surface wall, and a central portion corresponding to the root, wherein the first end corresponds to a pressure surface tip region of the composite fan blade and the second end corresponds to a suction surface tip region of the composite fan blade;

placing the core on the central portion of the stack of continuous plies to achieve an unfolded preform;

folding the continuous plies about the core, such that the central portion of the stack folds about the core and the first portion is superimposed to the second portion, to achieve a folded preform;

applying pressure to the folded preform to achieve a consolidated curved folded preform;

curing the consolidated curved folded preform to achieve the composite fan blade.

According to a forth aspect there is provided a gas turbine engine for an aircraft comprising a turbine, a compressor, and a shaft connecting the turbine to the compressor; a fan located upstream of the compressor, the fan comprising a plurality of composite fan blades according to the third aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
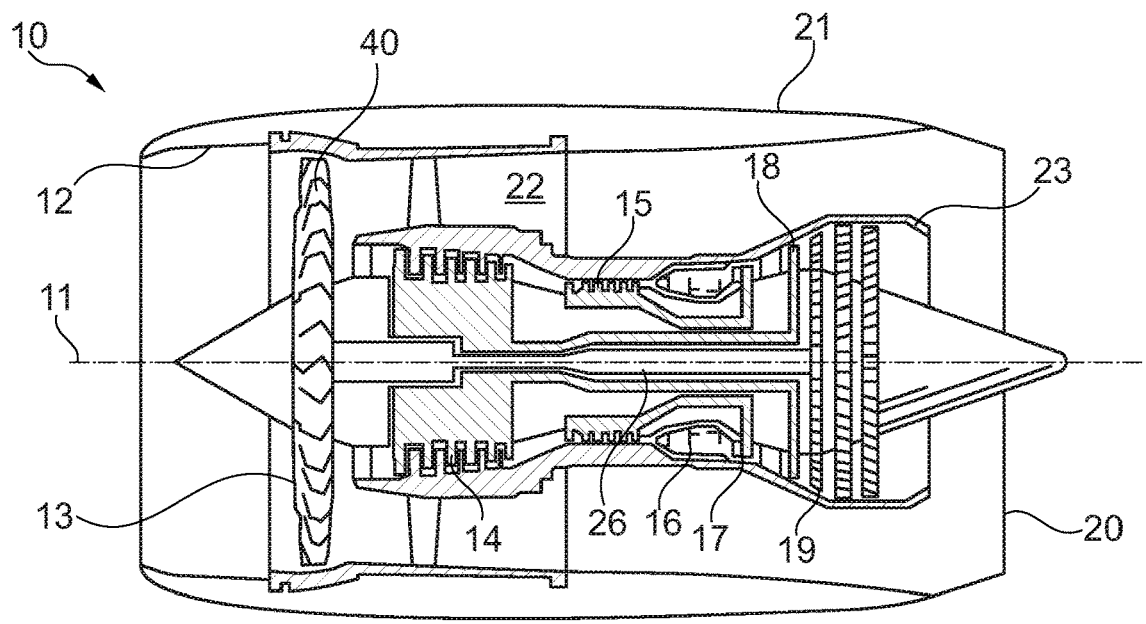
FIG. 1 is a sectional side view of a gas turbine engine.

FIG. 1 illustrates a gas turbine engine 10 having a principal rotational axis 11. The engine 10 comprises an air intake 12 and a propulsive fan 13 with a plurality of fan blades 40. The gas turbine engine 10 further comprises, in axial flow, an intermediate pressure compressor 14, a high-pressure compressor 15, combustion equipment 16, a high-pressure turbine 17, an intermediate pressure turbine 18, a low pressure turbine 19 and a core exhaust nozzle 23. A nacelle 21 surrounds the gas turbine engine 10 and defines a bypass duct 22 and a bypass exhaust nozzle 20. The fan 13 is coupled to and driven by the low pressure turbine 19 via shaft 26. In not illustrated embodiment, the gas turbine engine 10 may comprise a power gearbox and the fan 13 may be connected to the intermediate pressure compressor 14 through the power gearbox, which may be a reduction gearbox.

The gas turbine engine 10 works in a conventional manner with air being accelerated and compressed by the intermediate pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive the high pressure, intermediate pressure and low pressure turbines 17, 18, 19 before being exhausted through the nozzle 23 to provide some propulsive thrust. The high pressure turbine 17 drives the high pressure compressor 15 by a suitable interconnecting shaft. The fan 13 generally provides the majority of the propulsive thrust. Additionally or alternatively such engines may have an alternative number of compressors and/or turbines and/or an alternative number of interconnecting shafts.

Figure 2:
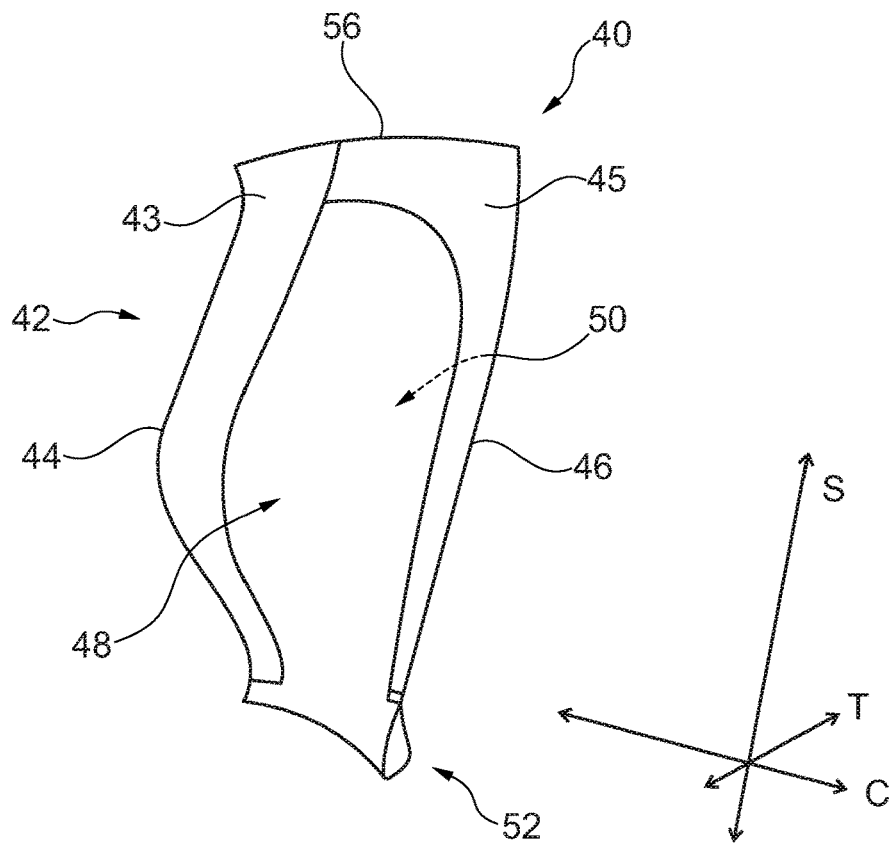
FIG. 2 is a schematic of a fan blade of the gas turbine engine of FIG. 1.
Figure 3:
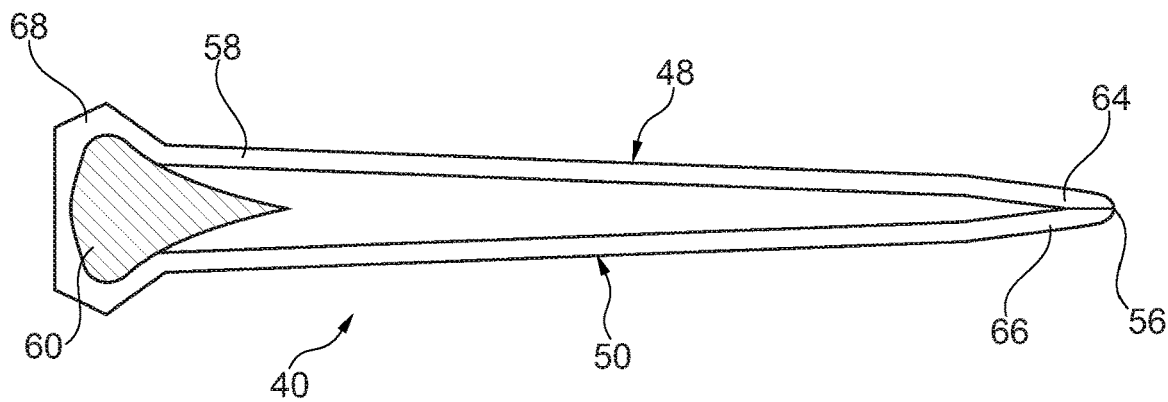
FIG. 3 is a schematic partial transversal sectional side view of the fan blade of FIG. 2.

FIGS. 2 and 3 illustrates the composite fan blade 40. The fan blades 40 each comprises an aerofoil portion 42 having a leading edge 44, a trailing edge 46, a pressure surface wall 48 extending from the leading edge 44 to the trailing edge 46 and a suction surface wall 50 extending from the leading edge 44 to the trailing edge 46. The fan blade 40 has a root 52 via which the blade can be connected to a rotor hub of the fan 13. The fan blade has a tip 56 at an opposing end to the root 52. The composite fan blade 40 may optionally comprise a leading edge protective metal sheet 43 and a trailing edge protective metal sheet 45.

In the present application, as is conventional in the art, a chordwise direction C is a direction that extends from the leading edge 44 to the trailing edge 46 of the blade. A spanwise direction S is a direction that extends from the root 52 to the tip 56 of the blade. A thickness direction T is a direction that extends from the pressure surface wall 48 to the suction surface wall 50 of the fan blade 40.

The fan blade 40 comprises an outer part 58 and a core 60. The outer part 58 defines the pressure surface wall 48 and the suction surface wall 50. The outer part 58 is made by a plurality of continuous plies 62 extending from a pressure surface tip region 64 to a suction surface tip region 66 through a root region 68 of the composite fan blade 40. The fan blade 40 may further comprise filler plies 70, deposited on the continuous plies 62. Contrary to the continuous plies 62, the filler plies 70 do not extend continuously from the pressure surface tip region 64 to the suction surface tip region 66 through the root region 68. On the contrary, the filler plies 70 are interrupted at the root region 68.

The core 60 is arranged in the root region 68 and is surrounded by the continuous plies 62. The core 60 may also be in contact with the filler plies 70. In particular, the core 60 may be in contact with end portions 72 of the filler plies 70.

In some embodiment not illustrated, the filler plies 70 may be dispensed with and the core 60 may be therefore in contact with the continuous plies 62 only.

Figure 4:
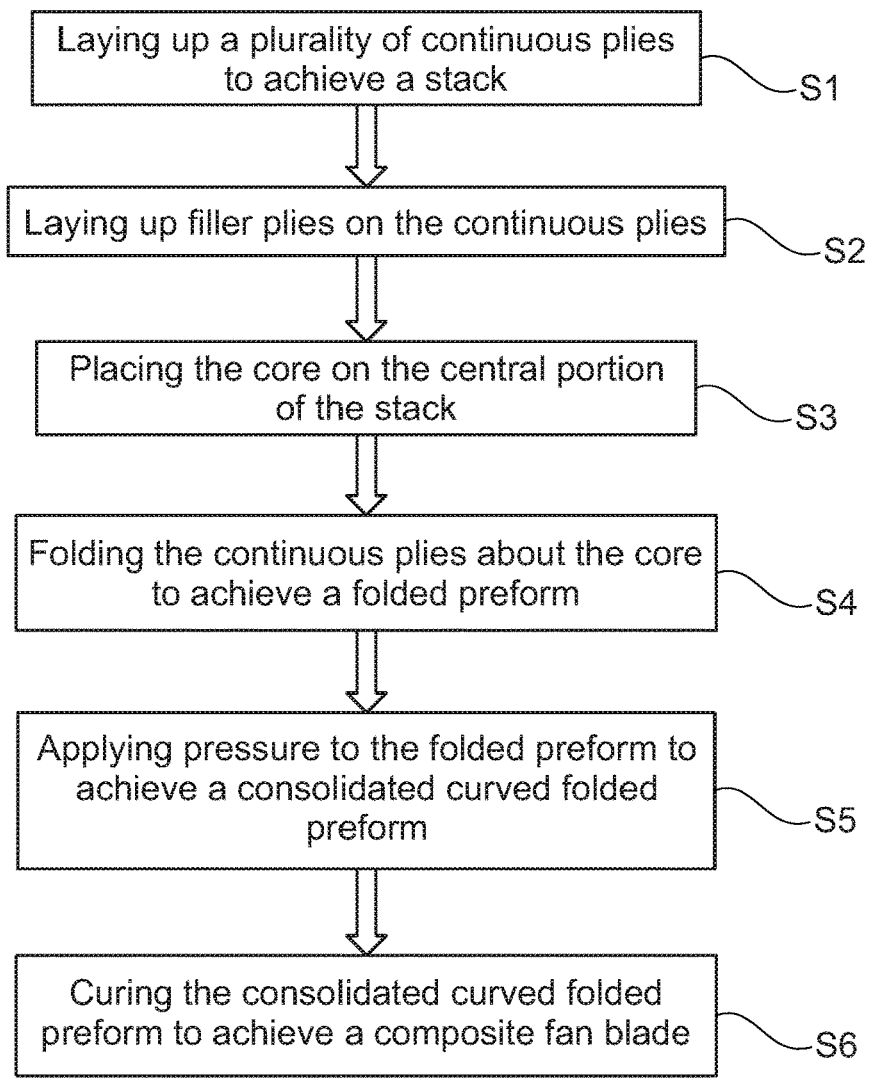
FIG. 4 is a flow diagram of a method of manufacturing the composite fan blade of FIG. 1.
Figure 5:
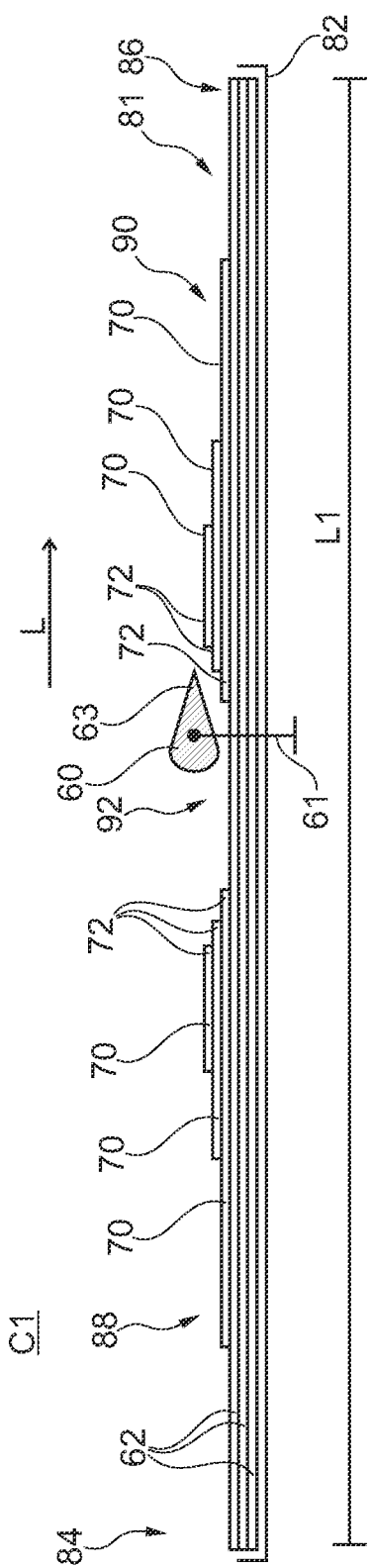
FIG. 5 is a sectional side view of an unfolded preform.
Figure 6:
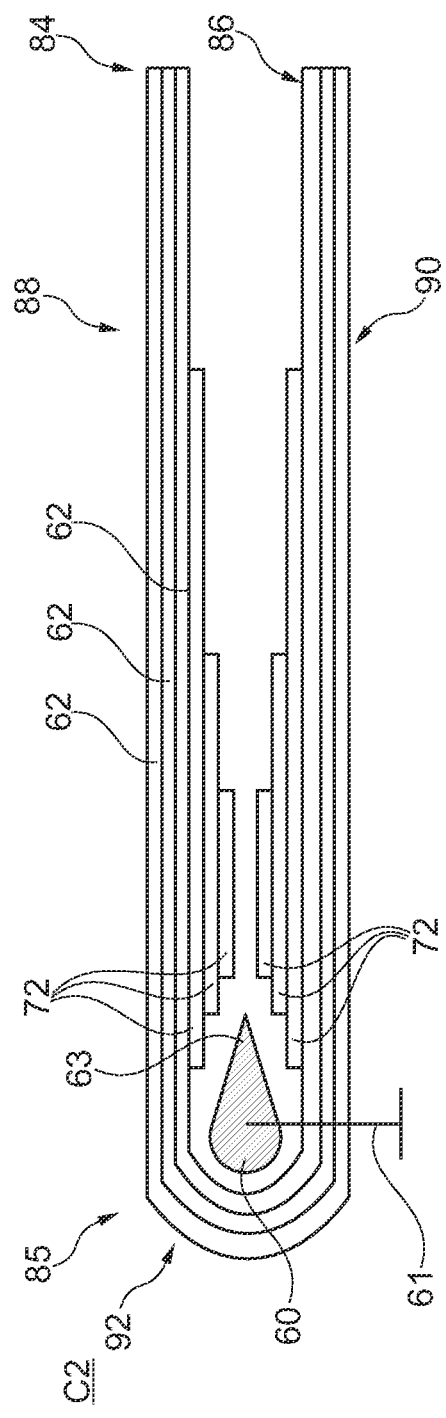
FIG. 6 is a sectional side view of a folded preform.

Referring now to FIG. 4, a flow diagram 100 illustrates a method of manufacturing a composite fan blade 40 according to the disclosure. The flow diagram will be described with reference to FIGS. 5 and 6 showing a composite fan blade preform in a first, unfolded configuration C1 and in a second, folded configuration C2.

At block 51, the method comprises laying up a plurality of continuous plies 62 on a preform tool 82, wherein the continuous plies 62 extends along a longitudinal direction L from a first end 84 to a second end 86 to achieve a stack 81 of continuous plies 62. If dry fibres are used, a layer of resin may be deposited on an internal surface (i.e. a surface facing up in FIG. 5) of each continuous ply 62. For example, the layer of resin may be a binder resin film that serves to fix a relative position of adjacent plies after application of heat, or a toughening layer that strengthens the interface between plies, or a combination of both.

The stack 81 comprises a first portion 88 corresponding to the pressure surface wall 48, a second portion 90 corresponding to the suction surface wall 50, and a central portion 92 corresponding to the root region 68. The first end 84 corresponds to the pressure surface tip region 64 and the second end 86 corresponds to the suction surface tip region 66.

In substance, the stack 81 corresponds to the outer part 58 of the fan blade 40 and extends for a preform length L1 substantially equal to a longitudinal profile of the fan blade 40.

To accommodate the stack 81 of continuous plies 62 in the first, unfolded configuration C1, the preform tool 82 extends along the longitudinal direction L for at least the preform length L1.

In one embodiment, the preform tool 82 may be substantially flat, so that the stack 81 of continuous plies 62 in the first, unfolded configuration C1 may be substantially flat. In other embodiments, the preform tool 82 may be curved, so that the stack 81 of continuous plies 62 in the first, unfolded configuration C1 may be curved. For example, the preform tool 82 may be curved to resemble the shape of the composite fan blade 40, in particular the shape of the pressure surface wall 48 and the suction surface wall 50 of the composite fan blade 40.

Optionally, at block S2, the method may further comprise laying up filler plies 70 on the continuous plies 62 both at the first portion 88 and at the second portion 90. In detail, a first group of filler plies may be deposited on the first portion 88 and a second group of filler plies 70 may be deposited on the second portion 90. The first group and the second group of filler plies 70 may, or may not, be symmetrical with respect to a plane transversal to the longitudinal direction L and laying midway between the first end 84 and the second end 86 of the continuous plies 62. The first group and the second group of filler plies 70 may be arranged in two separate stacks. Each individual filler ply 70 may present different lengths. For example, the filler plies 70 closer to the continuous plies 62 may be longer than the filler plies 70 being arranged in the stack farther from the continuous plies 62.

At block S3, the method comprises placing the core 60 on the central portion 92 of the stack 81 of continuous plies 62 to achieve the composite fan blade preform in the first, unfolded configuration C1, or unfolded preform 83. The core 60 may be placed on the stack 81 either manually or automatically, for example by means of any suitable robot or automatic fibre placement (AFP) machine. The core 60 may feature a tapered end 63 that may be oriented, in the unfolded configuration C1 towards either the first end 84 (not illustrated) or the second end 86 (as illustrated). The core 60 may be separately manufactured and then placed on the central portion 92 of the stack 81 of continuous plies 62, either manually or by means of any suitable robot. Alternatively, the core 60 may be placed on the central portion 92 of the stack 81 of continuous plies 62 as part of a manual or automatic lay-up process, for example by means of an automatic fibre placement (AFP) machine.

At block S4, the method comprises folding the continuous plies 62 about the core 60, such that the first portion 84 is superimposed to the second portion 86, to achieve the composite fan blade preform in the second, folded configuration C2, or folded preform 85. The folding of the continuous plies 62 may be carried out either manually or by means of a robot provided with grippers to grip the continuous plies 62 at the first end 84.

During folding, the core 60 may be kept in position manually or by means of a frame 61. The frame 61 may be self-standing or attached to the preform tool 82. The frame 61 may be mounted on a movable robot or attached to an AFP machine. All of the continuous plies 62 may be folded at one time, or the continuous ply 62 may be folded individually or in groups of two or more continuous plies 62.

During folding, to avoid wrinkles, the method may comprise applying pressure, either manually or by means of a roller, to the continuous ply being folded from the root 52 to the tip 56. Alternatively, or in addition, tension may be applied to the first end 84 and the second end 86 of the continuous ply 62 by means of the grippers.

The method may additionally comprise applying through thickness reinforcement to reinforce the core 60 to the outer part 58. Moreover, the method may comprise applying through thickness reinforcement to reinforce the core 60 to the central portion 92 and/or the first portion 88 and/or the second portion 90. The method may further comprise applying through thickness reinforcement to promote adhesion between the first portion 88 and the second portion 90.

At block S5, the method comprises applying pressure to the folded preform 85 to achieve a consolidated curved folded preform. Before applying pressure, the folded preform 85 may be transferred from the preform tool 82 to a form tool shaped to the finished shape of the fan blade 40. Once in the form tool, pressure is applied to the folded preform 85 to achieve the finished shape of the fan blade 40. Additionally, both pressure and heat may be applied to the folded preform 85. Moreover, vacuum may be applied to the folded preform 82 to promote debulking.

At block S6, the method comprises curing the consolidated curved folded preform to achieve the composite fan blade 40. The consolidated curved folded preform may be placed in a cure tool within a vacuum bag and cured in an autoclave under suitable temperature and pressure conditions.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A method of manufacturing a composite fan blade extending spanwise from a root to a tip, chordwise from a leading edge to a trailing edge, the composite fan blade comprising an outer part and a core, the outer part defining a pressure surface wall extending from the leading edge to the trailing edge and a suction surface wall extending from the leading edge to the trailing edge, the method comprising:

laying up a plurality of continuous plies extending along a longitudinal direction from a first end to a second end to achieve a stack of continuous plies, the stack comprising a first portion corresponding to the pressure surface wall, a second portion corresponding to the suction surface wall, and a central portion corresponding to the root, wherein the first end corresponds to a pressure surface tip region of the composite fan blade and the second end corresponds to a suction surface tip region of the composite fan blade;

placing the core on the central portion of the stack of continuous plies to achieve an unfolded preform;

folding the continuous plies about the core, such that the central portion of the stack folds about the core and the first portion is superimposed to the second portion, to achieve a folded preform;

applying pressure to the folded preform to achieve a consolidated curved folded preform; and curing the consolidated curved folded preform to achieve the composite fan blade; wherein
in the folding step the central portion of the stack folds about the core so as to form the root, and the first portion and the second portion extend in a spanwise direction between the root and respective tip regions.

2. The method according claim 1, wherein the composite fan blade further comprises filler plies, and wherein the method further comprises:
laying up the filler plies on the continuous plies both on the first portion and on the second portion, the filler plies not extending from the first portion to the second portion through the central portion.

3. The method according claim 1, comprising, after the folding of the continuous plies, applying heat and/or pressure to the folded preform to promote adhesion of the core to the outer part.

4. The method according to claim 1, wherein the folding of the continuous plies comprises folding all of the continuous plies at one time.

5. The method according to claim 1, wherein the folding of the continuous plies comprises folding each continuous ply individually.

6. The method according to claim 1, wherein the folding of the continuous plies comprises folding the continuous plies in groups of two or more plies.

7. The method according to claim 1, comprising, during the folding of the continuous plies, applying pressure either manually or by means of a roller to the continuous ply being folded from the root to the tip.

8. The method according to claim 1, wherein the continuous plies are made of dry fibres.

9. The method according to claim 1, comprising, after the laying up of each continuous ply, depositing on an internal surface of said continuous ply a layer of resin.

10. The method according to claim 1, wherein the continuous plies are made of pre-impregnated fibres.

11. The method according to claim 1, comprising applying through thickness reinforcement to reinforce the core to the outer part.

12. The method according to claim 11, wherein through thickness reinforcement comprises any one of tufting, stitching, felting, z-pinning, or intra-layer toughening using veils and nanoforests or thermoplastic toughening particles.

13. The method according to claim 1, comprising, during the folding of the continuous plies, keeping the core in position by means of a frame.

14. The method according to claim 1, wherein the folding of the continuous plies comprises rotating either the first or the second end by substantially 180° about the core towards the second end or the first end, respectively.

15. The method according to claim 1, wherein the placing of the core in the central portion comprises depositing a plurality of chopped fibres on the central portion of the continuous plies.

16. The method according to claim 1, wherein the laying-up of the plurality of continuous plies is carried out manually or automatically using automatic fibre placement.

* * * * *